Dec. 3, 1968    R. HOCHART    3,414,471
PULP MOLDING APPARATUS
Filed June 11, 1964    7 Sheets-Sheet 1

INVENTOR:
ROGER HOCHART

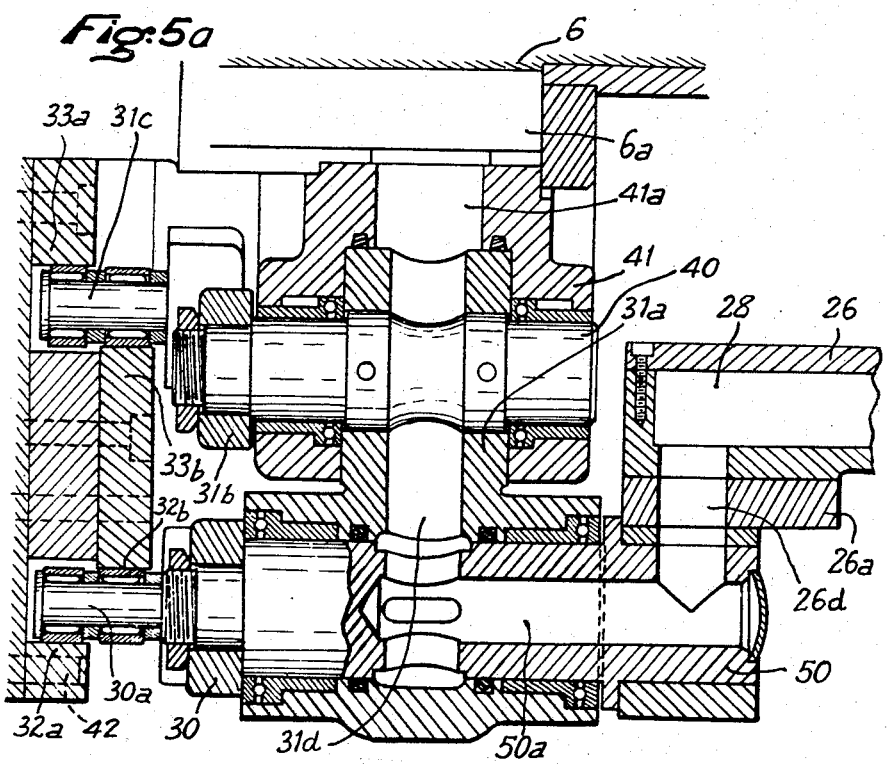

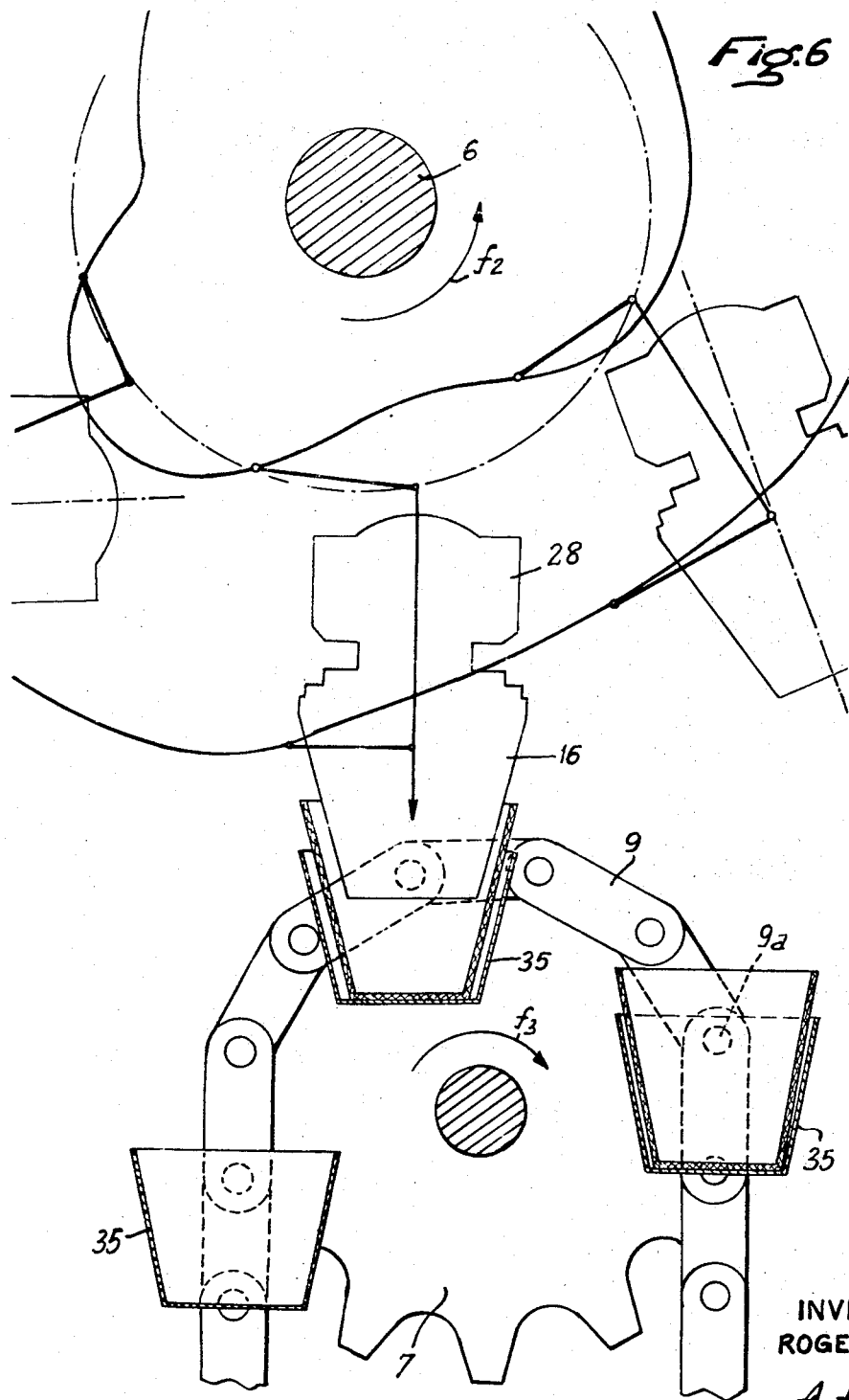

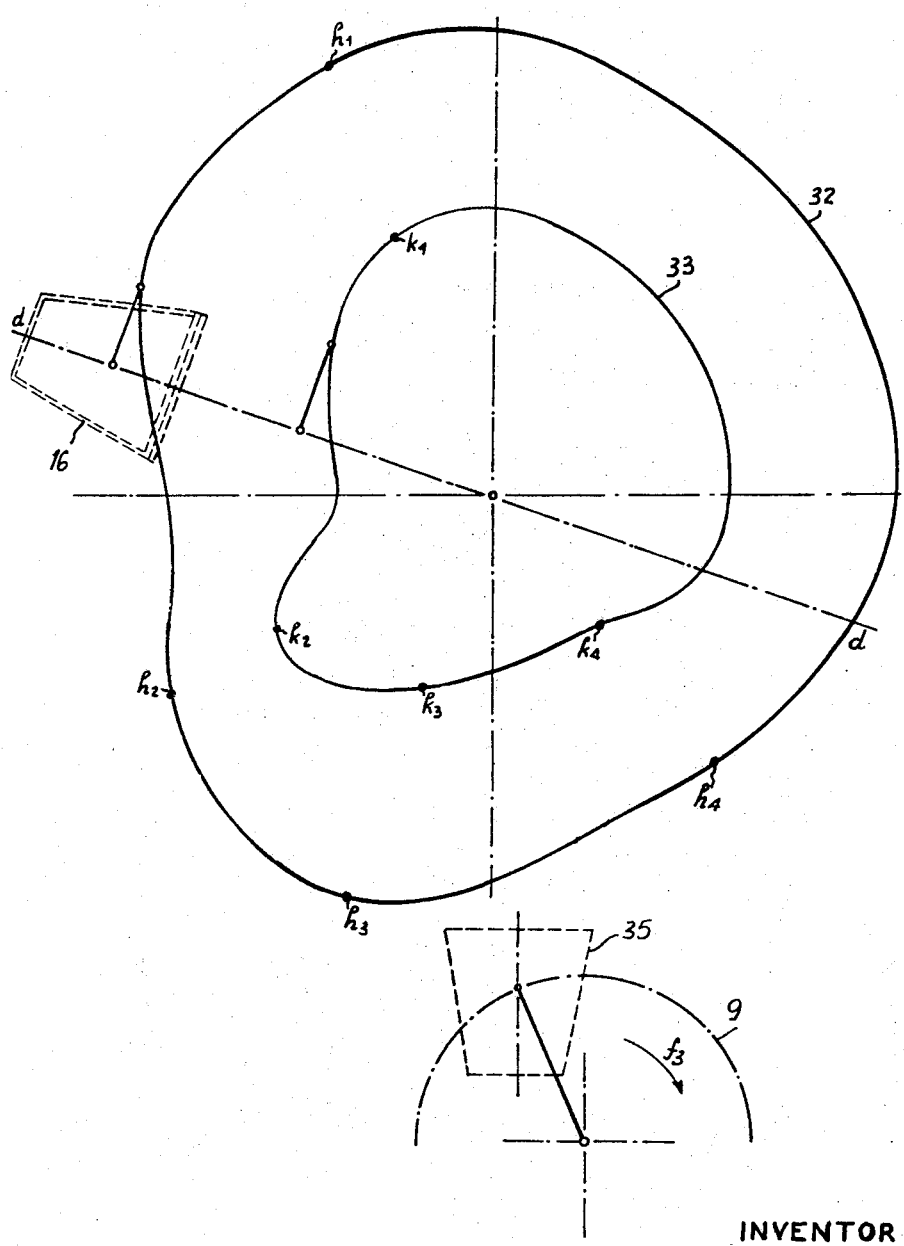

United States Patent Office 3,414,471
Patented Dec. 3, 1968

3,414,471
PULP MOLDING APPARATUS
Roger Hochart, Rambervillers, France, assignor to Henry Boucher Fils & Cie, Rambervillers, Vosges, France, a corporation of France
Filed June 11, 1964, Ser. No. 374,378
Claims priority, application France, Mar. 26, 1964, 968,844
1 Claim. (Cl. 162—392)

ABSTRACT OF THE DISCLOSURE

A pulp molding apparatus having a first drum carrying a plurality of molds and a second drum carrying a plurality of plungers for the molds. Apparatus for bringing the axis of each of said plungers successively into coincidence with the axis of a corresponding mold, which includes cam means, levers and arms connected so that each plunger undergoes a simultaneous pivotal and translational motion toward a mold to remove a molded article from the mold.

---

The present invention relates to the manufacture of pots of fibrous material and especially plant pots.

At the present time, the manufacture of certain types of pots is carried out by the following steps: depositing a layer of fibrous material on one face of a metallic fabric, sucking through said fabric a bath containing said fibrous material in suspension, introducing a hollow plunger within said mold, applying said layer on the plunger and detaching said layer from said metallic fabric as a result of the thrust exerted through the fabric by a compressed fluid.

In certain machines for the practical application of the afore-described process, the various operations mentioned above are carried out by non-continuous movements of rotation of a hollow shaft which carries the fabric. Machines of this type have limited efficiency.

The main object of the present invention is to overcome this disadvantage and consists in particular of a machine which is characterized in that it comprises a first drum carrying molds and a second drum carrying plungers; in that said drums are adapted to rotate about their respective axes in a continuous motion; in that the molds consist of a metallic fabric or the like which reproduces the external shape of the pot to be fabricated; and in that means are provided for bringing the axis of the plunger and the axis of the corresponding mold into coincidence with each other during a period of time which commences shortly before the axis of the mold passes onto the plane which passes through the axes of the drums and which terminates shortly afterwards and means for moving the plunger towards and away from said mold during said period of time.

In the description which now follows, reference will be made to the accompanying diagrammatic drawings which are given solely by way of example, and in which:

FIG. 5a is a sectional view of said coupling system, a portion of which is broken away;

FIG. 5b is a partial sectional view of that portion of the coupling which is not illustrated in FIG. 5a;

FIG. 6 is a partial sectional diagrammatic view of the plunger-carrier drum and of the device for conveying pots towards the drying section;

FIG. 7 is a schematic view of the plunger operating cams.

Figure 1:
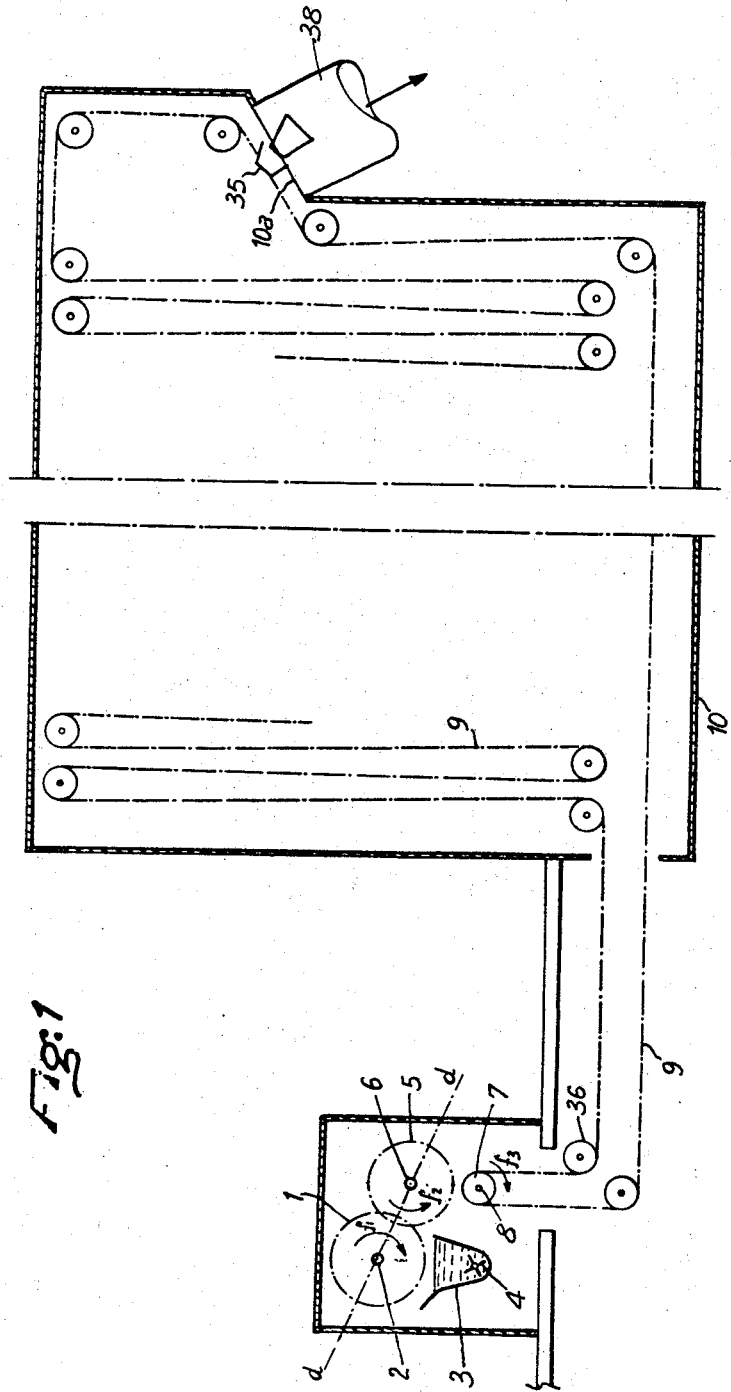
FIG. 1 is a sectional diagrammatic view of the combined assembly of a machine in accordance with the present invention.

As shown in FIG. 1, the machine which is illustrated mainly consists of a mold-carrier drum 1 which is driven by a shaft 2 in the direction of the arrow $f_1$, an aqueous fibrous slurry, a dipping bath 3 fitted with an agitator 4, a drum 5 for carrying the transfer plungers and driven by a shaft 6 in the direction of the arrow $f_2$, a receiving device formed by two sprocket wheels 7 which are driven by a shaft 8 in the direction of the arrow $f_3$ and by two conveyor chains 9 and finally a drying section 10.

Figure 2:
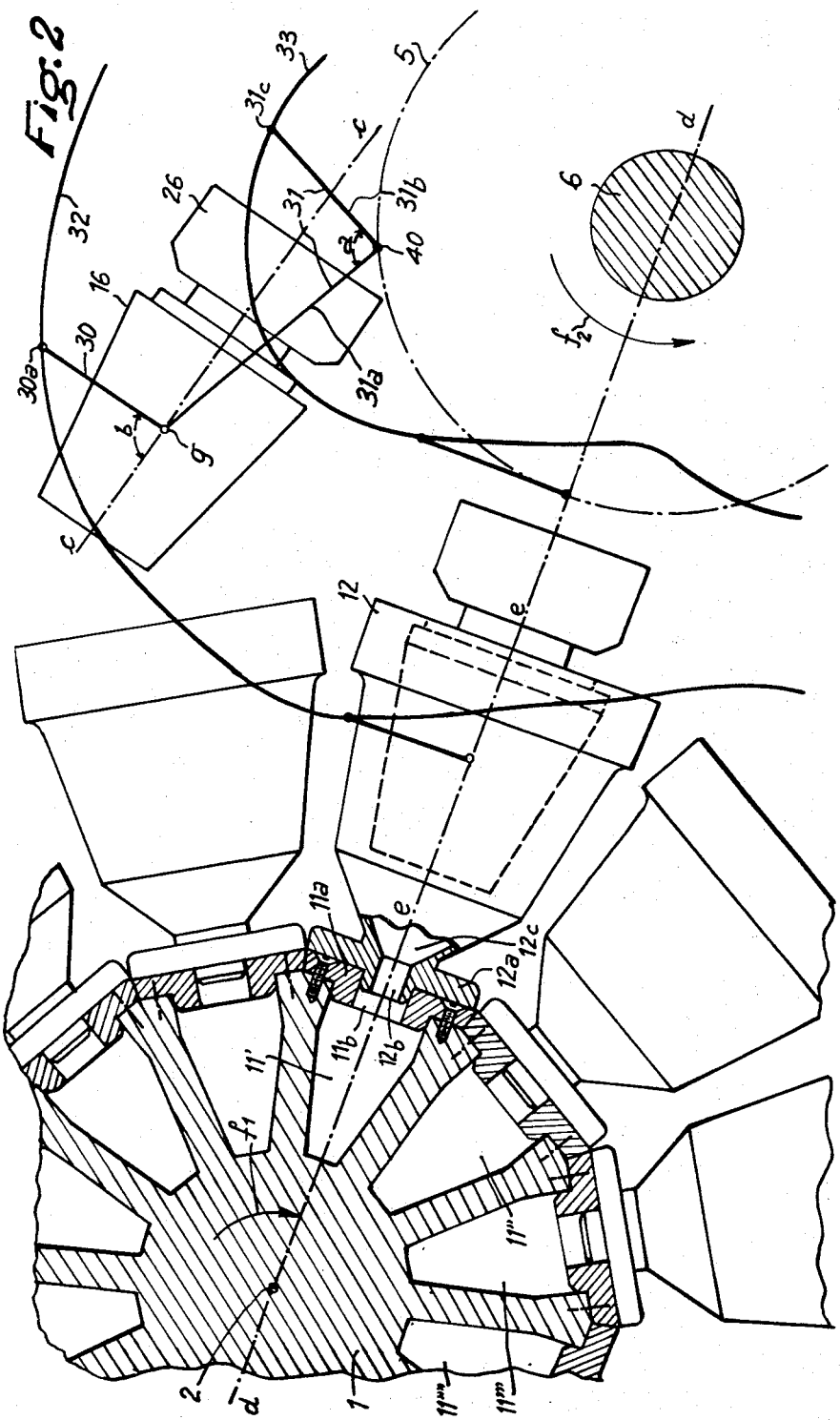
FIG. 2 is a diagrammatic view of a portion of the mold-carrier drum and transfer-plunger carrier drum of this machine.

As appears in particular from FIG. 2, the hub of the mold-carrier drum 1 is provided in this case with twelve chambers 11 which extend over its entire periphery. One of the extremities of said hub, with which the chambers 11 are in communication, is adapted to move in a known manner in front of a stationary end-plate (not illustrated) which forms a distributor. Under these conditions, each chamber 11 is successively put into communication with a pressure source, with the atmosphere and with a vacuum source.

Figure 3:
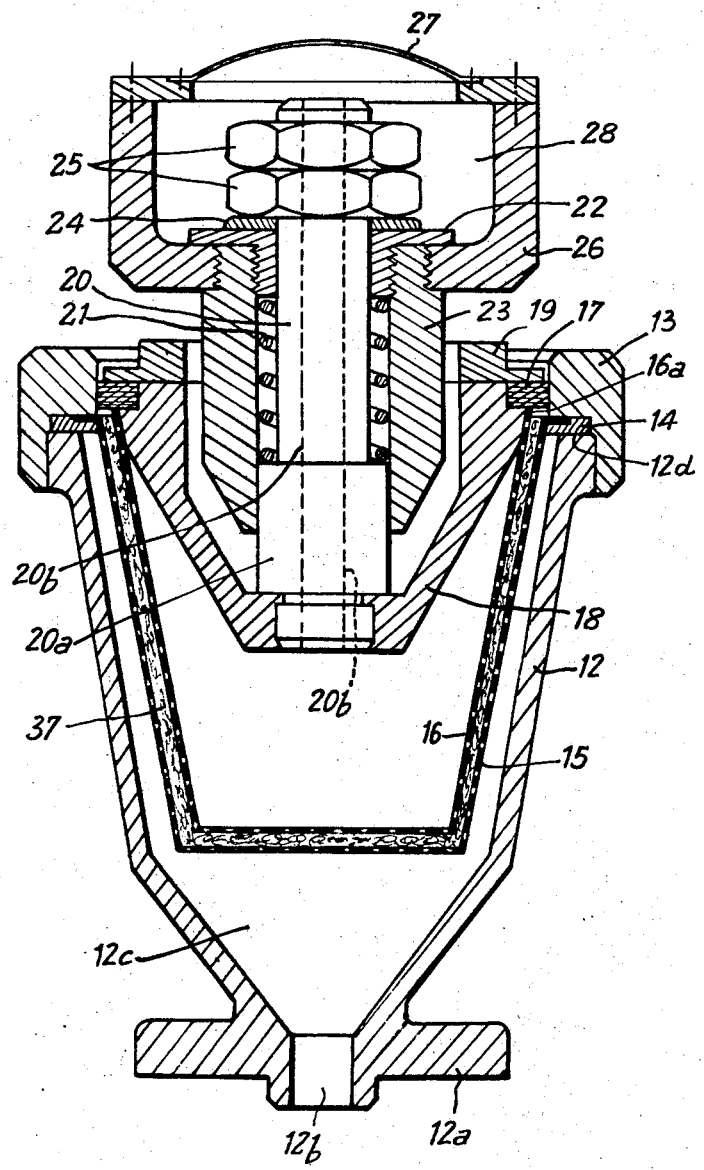
FIG. 3 is a sectional view of a mold and of its plunger.

The base 12a of a casing 12 is mounted on the outer wall 11a of each chamber 11. The interior 12c of said casing 12 is put into communication with the corresponding chamber 11 via an opening 12b which is formed through the base 12a and via an opening 11b which is formed through the wall 11a. A ring 14 which is made, for example, of copper is secured by means of a washer 13 of suitable plastic material, such as for example "nylon," to the edges 12d of the casing 12 having the shape of a frusto-conical vessel, as shown in FIG. 3. There is welded onto said ring 14 a perforated plate 15, the shape of which corresponds to the external shape of the pot to be fabricated and which will be designated hereinafter as a mold.

The drum 5 is located next to the drum 1 (as shown in FIG. 1) and drives six transfer plungers 16 (as shown in FIG. 2). The said transfer plungers 16 are formed as a perforated frusto-conical plate, the upper edges 16a of which (FIG. 3) are secured to a support 18. The shape of the plate 16 corresponds to the internal configuration of the pot to be fabricated. A washer 17 is clamped between the support 18 and a metal ring 19 which is mounted on the former. There is fixed on said support 18 a rod 20 which is provided with a shouldered portion 20a on which is exerted the action of a spring 21, the other end of which is applied against a nut 22. There is formed within the rod 20 an axial bore 20b. The afore-mentioned nut 22 is screwed into an internally threaded portion of a sleeve 23 which surrounds the spring 21 and which is guided by the shouldered portion 20a. A washer 24 is interposed between the nut 22 and two hexagonal nuts 25 are screwed onto the end of the rod 20.

The sleeve 23 is screwed into a crosshead 26 which is also held in position by the nut 22. Said crosshead 26 is closed in fluid-tight manner by means of a cover 27 which forms with said crosshead a chamber 28.

Figure 4:
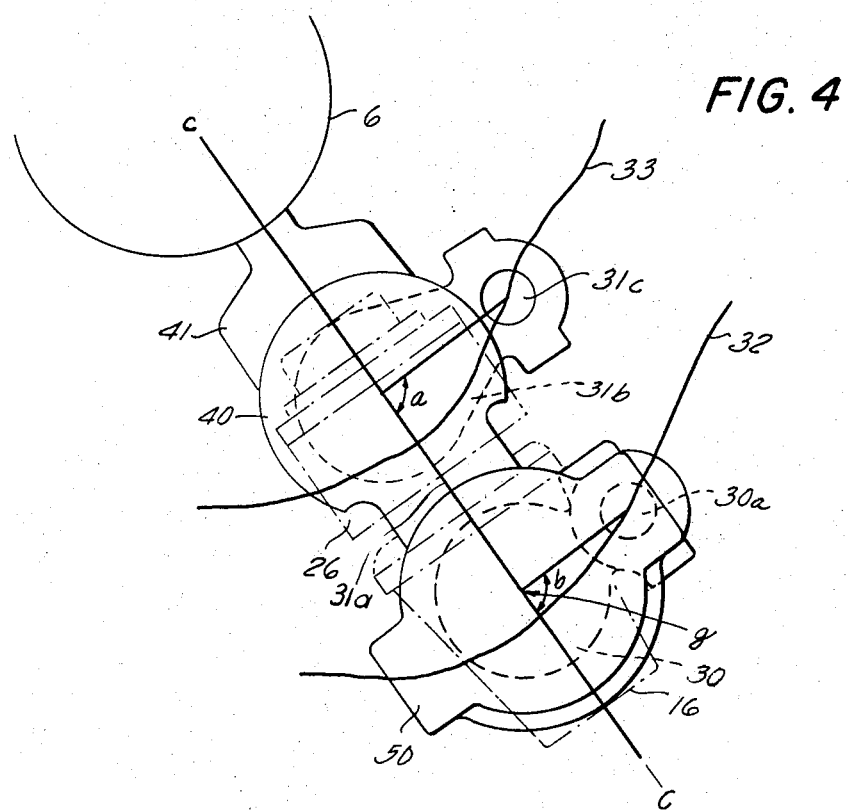
FIG. 4 is a diagrammatic view of the system of coupling between a plunger and the plunger-carrier drum.
Figure 5B:
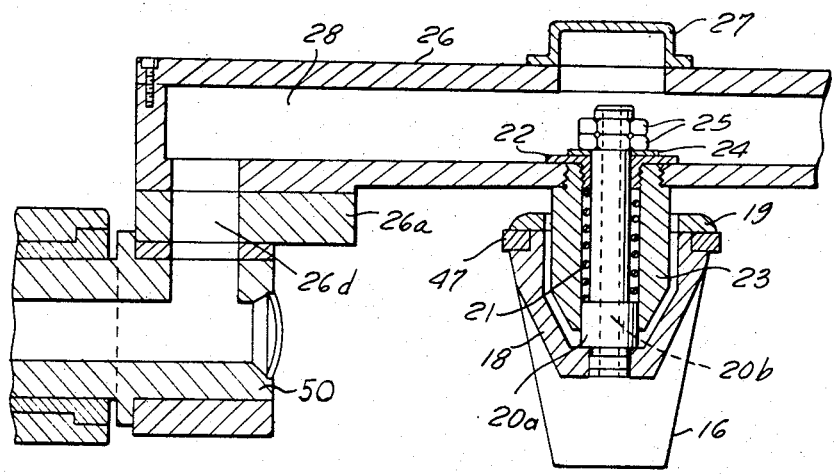

As can especially be seen from FIGS. 4 and 5, the extremities of the crosshead 26 are bent back in such manner as to form a U, the arms 26a of which are keyed on hollow shafts 50, the axes of which pass through the point g which is approximately the center of gravity of the combined assembly as designated by the references 16 to 27 and which is shown in FIGS. 2 and 4. Each shaft 50 is axially pivotally mounted on a hollow coupling lever 31a. Said coupling lever member is in turn pivotally mounted on a hollow arm 41 which is integral with the shaft 6. There is formed in the shaft 6 a longitudinal bore 6a which extends through its entire length and which communicates with a distributor mounted on the frame 42 of the apparatus. The said distributor is designed to establish a communication between the bore 6a and either a pressure source or a vacuum source. The pressure or partial vacuum is transmitted through the bore 6a, the port 41a of the arm 41, the bore 31d of the coupling lever 31a, the axial bore 50a of the shaft 50, the passage 26d from the arm 26a to the chamber 28 and then into the interior of the plunger 16 (as shown in FIG. 3).

The arm 30, which is diagrammatically shown in FIG. 2 is keyed onto the shaft 50 and makes a constant angle b with the longitudinal shaft c—c of the plunger 16. The free end 30a of said arm 30 is constrained to follow a stationary cam 32 formed by two guides 32a and 32b (as shown in FIG. 5). The coupling lever 31a forms with another lever 31b an elbowed lever 31 having an angle a and capable of pivoting about the axis of the shaft 40 which is carried by the arm 41 (as shown in FIG. 5). The extremity 31c of the arm 31b is constrained to follow a stationary cam 33 which is formed by two guides 33a and 33b (as shown in FIG. 5).

Accordingly, the crosshead 26 which is maintained at each extremity by the device which has just been described not only performs a movement of rotation about the shaft 6 but also a pivotal movement about the shaft 50. The plunger 16 will be driven in rotation about the shaft 6 by the drum 5 and will at the same time perform a rocking movement about its axis g as materialized by the shafts 50, and a relative displacement relatively to the drum 5. These last movements are determined by the shapes of the cams 32 and 33.

The receiving device consists of two chain-wheels 7 which drive two conveyor chains 9 (as shown in FIG. 6). Pivoted carrier buckets 35 are suspended from the pins 9a of certain links of these chains and between these latter. The chains 9 which are driven by the sprocket-wheels 7 pass over idler pulleys 36 and are thus intended to move into the drying section 10 (shown in FIG. 1). The pivoted carrier buckets 35 are designed to accommodate plant pots as will be explained below and are inverted over an opening 10a (see FIG. 1) of the drying section 10, then carried away after the drying stage to a discharge chute 38.

The operation of this machine is as follows:

The drum 1 which is driven in the direction of the arrow $f_1$ by its shaft 2 brings the twelve chambers 11 successively (FIG. 2) in front of the distributor 42 in such manner that a certain number of these chambers are at reduced pressure while a certain number are at an increased pressure or atmospheric pressure. Under these conditions, the chambers 12c of the casings 12 are connected either to reduced pressure or to increased pressure or to atmospheric pressure via the openings 11b and 12b as explained earlier. Accordingly, referring now to one of the chambers 11, said chamber is at a higher than atmospheric pressure in position 11' as shown in FIG. 2. When the shaft 2 has performed a movement of rotation through an angle of 30°, the chamber referred to will be located in position 11" and will accordingly be at atmospheric pressure. In the other positions, this same chamber will be at a reduced pressure, or partial vacuum.

That face of the mold 15 which is directed towards the chamber 12c in positions 11''' and 11'''' of chamber 11 will be at reduced pressure and the edges 12d of the casing 12 are immersed in the liquid of the container 3 which contains fibrous material in suspension. The result thereby achieved is that the fibers which are maintained in suspension by the agitator 4 within the vessel 3 (as shown in FIG. 1) are accordingly applied due to the partial vacuum formed in chamber 12c, against the perforated mold 15 and form a coating or layer 37 on the latter.

In those positions of the chamber 11 which are located between positions 11'''' and 11', and since a partial vacuum still prevails within the chamber 12c, the layer of fibers 37 drips dry due to the gravitational pull.

During the period when the chamber 11 is located in the position which precedes position 11' and the position 11'', the plunger 16, which is carried by the shaft 6 is brought in front of the mold 15, whereupon their axes c—c and e—e are made to coincide. Finally, the plunger 16 penetrates into the mold 15. When said plunger comes into contact with the layer 37, the chamber 11 is in position 11' and is accordingly under pressure whereas the chamber 28 (as shown in FIG. 3) is under a partial vacuum, with the result that the layer 37 then separates from the mold 15 and is applied against the plunger 16. The said plunger then withdraws and carries with it the layer 37. While all these operations are in progress, with the exception of the last, all contact between the piston 16 and the layer 37 is avoided.

As the movement continues, the plunger 16 draws with it the layer 37 while a reduced pressure or partial vacuum is maintained within the chamber 28. The plunger 16 moves over a pivoted carrier bucket 35 (as shown in FIG. 6) which is driven in the direction of the arrow $f_3$ by the chain 9. While the plunger 16 is located above the pivoted carrier bucket 35, the chamber 28 is put under pressure. The compressed air then flows through the rod 20 which is shown in FIG. 3 and detaches the plunger 16 from the layer 37 which drops into the pivoted carrier bucket 35. The bucket then carries the layer 37 away to the drying section 10. Most of the water still remaining in said layer 37 is then removed, thereby endowing this latter with a consistency which is sufficient to enable it to be overturned and discharged above the opening 10a and carried away via the discharge chute 38 to the storage section without any danger of deformation.

All the movements of the plungers 16 opposite the molds 15 are dependent not only on the lengths of the arms 30, 31a, 31b, on the angles a and b and on the relative speeds of rotation of the shafts 2 and 6 but also on the shapes of the corresponding portions of the cams 32 and 33. The movements of the plungers 16 into overhead relation with the pivoted carrier buckets 35 are also dependent not only on the speeds of rotation of the shafts 6 and 8 but also on the corresponding portions of the cams 32 and 33.

FIG. 7 shows the shapes of the said cams 32 and 33 when the parameters referred to above have been determined. The arcs $h_1$, $h_2$ and $k_1$ and $k_2$ of the cams 32 and 33 correspond to the movements of the plungers 16 relatively to the molds 15; the arcs $h_3$, $h_4$ and $k_3$, $k_4$ of these cams correspond to the movements of the plungers 16 into overhead relation with the pivoted carrier buckets 35.

The arcs $h_2$, $h_3$, $h_4$, $h_1$ and $k_2$, $k_3$, $k_4$ are connecting arcs.

It will readily be apparent that the present invention is not limited to the example described. It accordingly follows, for example, that (a) The cams 32 and 33 can have different shapes.

(b) Whereas it has been assumed in the foregoing that the drum 1 comprised only one ring of twelve molds 15c and that the drum comprised only one ring of six plungers 16, the machine can comprise a number of rings of molds and plungers disposed side by side on the drums 1 and 5. In this case, each pivoted carrier bucket 35 receives a number of pots at the same time.

(c) The pivoted carrier buckets 35 can be permanently fitted with receiving vessels which substantially conform to the external shape of the layers. In this case, arcs $h_3$, $h_4$, $k_3$, $k_4$ have shapes such that the plungers 16 penetrate to a slight extent within said vessels so that the layers 37 carried by said plungers 16 are deposited in the vicinity of the bottom of each vessel in order to prevent any deformation of the layers which are still charged with moisture.

What we claim is:

1. In a machine for the manufacture of pots or the like of fibrous material, a first drum, rotatably mounted in said machine for carrying a plurality of molds which conform to the external shape of said pots; a second drum rotatably mounted in said machine substantially parallel to said first drum for carrying a plurality of plungers which conform to the internal shape of said pots, said molds and plungers being formed with perforated walls, said first and second drums being adapted to rotate in a continuous and synchronized manner; an improvement, comprising means for bringing the longitudinal axis of each one of said plurality of plungers successively into coincidence with the longitudinal axis of a corresponding mold of said plurality of molds, over a period of time which commences a relatively short time before said mold passes the plane which is formed by the axes of said first and second drums, and which terminates a relatively short time after said mold has passed through said plane, said means including:

first and second stationary cam means operatively mounted on said second drum, a plurality of elbow means, having two levers with a constant angle therebetween and being pivotally mounted on said second drum at their common axis, each one of said elbow means having first cam following means operatively mounted on one lever of said two levers and cooperating with said first cam means; a plurality of lever means having a pair of arms, each lever means of said plurality of lever means being pivotally mounted on the other one of said two levers, each one of said lever means carrying one of said plungers with one arm of said pair of arms and having second cam following means mounted on the other arm of said pair of arms cooperating with said second cam means;

whereby said plurality of plungers undergo a simultaneous pivotal and translational motion and said plurality of molds a movement of approach and withdrawal during said period of time in such a manner that said plunger brings a formed pot onto said mold.

References Cited

UNITED STATES PATENTS

| | | | |
|---|---|---|---|
| 2,881,679 | 4/1959 | Cox | 162—391 |
| 2,995,188 | 8/1961 | Chaplin | 162—392 |
| 3,016,090 | 1/1962 | Chaplin | 162—392 X |
| 3,166,468 | 1/1965 | Daniele et al. | 162—392 |

FOREIGN PATENTS 619,466  5/1961  Canada.

S. LEON BASHORE, *Primary Examiner.*